United States Patent
Vogel et al.

(10) Patent No.: US 12,194,576 B2
(45) Date of Patent: *Jan. 14, 2025

(54) SYSTEMS, METHODS, AND APPARATUS FOR PRE- REGULATOR CONTROL IN WELDING-TYPE POWER SUPPLIES

(71) Applicant: ILLINOIS TOOL WORKS INC., Glenview, IL (US)

(72) Inventors: Bernard J. Vogel, Troy, OH (US); Adam E. Anders, Oshkosh, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,798

(22) Filed: Nov. 2, 2023

(65) Prior Publication Data
US 2024/0058884 A1   Feb. 22, 2024

Related U.S. Application Data

(63) Continuation of application No. 16/143,893, filed on Sep. 27, 2018, now Pat. No. 11,839,939.

(51) Int. Cl.
*B23K 9/10*   (2006.01)
*H02M 3/156*   (2006.01)
(Continued)

(52) U.S. Cl.
CPC .......... *B23K 9/1062* (2013.01); *H02M 3/156* (2013.01); *H02M 7/12* (2013.01); *H02M 7/44* (2013.01)

(58) Field of Classification Search
CPC .......... H02M 7/44; H02M 7/12; H02M 3/156; B23K 9/1062; B23K 9/1043; B23K 9/0953; B23K 9/0956; B23K 9/173; B23K 9/32
(Continued)

(56) References Cited

U.S. PATENT DOCUMENTS

4,631,627 A * 12/1986 Morgan .................... H01H 9/56
361/186
5,601,741 A *  2/1997 Thommes ................. B23H 7/08
219/130.21
(Continued)

*Primary Examiner* — Eric S Stapleton
(74) *Attorney, Agent, or Firm* — McAndrews, Held & Malloy, Ltd.

(57) ABSTRACT

Apparatus, systems, and/or methods are disclosed relating to a welding-type power supply with a pre-regulator circuit configured to provide a pre-regulated direct current (DC) bus at two or more voltage levels, responsive to various operating conditions. In some examples, the pre-regulator circuit may be configured to provide a pre-regulated DC bus voltage at one voltage level for certain input line voltages, weld processes, and/or target weld output levels, and at another voltage level for other input line voltages, weld processes, and/or target weld output levels. In some examples, the pre-regulator circuit may be configured to provide a pre-regulated DC bus voltage for certain input line voltages, weld processes, and/or target weld output levels and an unregulated DC bus voltage at other input line voltages, weld processes, and/or target weld output levels. In some examples, the pre-regulator circuit may be configured to provide a pre-regulated DC bus at a service voltage in response to detecting a service mode of operation, and/or at an idle voltage in response to detecting an idle mode of operation.

15 Claims, 4 Drawing Sheets

(51) Int. Cl.
*H02M 7/12* (2006.01)
*H02M 7/44* (2006.01)

(58) Field of Classification Search
USPC .................................................. 219/130.21
See application file for complete search history.

(56) References Cited

U.S. PATENT DOCUMENTS

| | | | | | |
|---|---|---|---|---|---|
| 5,968,385 | A * | 10/1999 | Beeson | ............... | B23K 9/0956 |
| | | | | | 219/133 |
| 5,991,180 | A * | 11/1999 | Vogel | .................... | H02M 3/155 |
| | | | | | 363/17 |
| 6,115,273 | A * | 9/2000 | Geissler | ............... | B23K 9/1056 |
| | | | | | 363/89 |
| 6,239,407 | B1 * | 5/2001 | Thommes | ............ | B23K 9/0953 |
| | | | | | 219/130.21 |
| 6,317,248 | B1 * | 11/2001 | Agrawal | ................ | G02F 1/155 |
| | | | | | 348/148 |
| 6,329,636 | B1 * | 12/2001 | Geissler | ............... | B23K 9/1056 |
| | | | | | 363/142 |
| 6,402,546 | B1 * | 6/2002 | Groves | .................. | H02G 11/02 |
| | | | | | 439/501 |
| 6,713,721 | B2 * | 3/2004 | Albrecht | ............. | B23K 9/1062 |
| | | | | | 219/130.1 |
| 6,849,827 | B2 * | 2/2005 | Thommes | ............ | B23K 9/0953 |
| | | | | | 219/130.21 |
| 6,865,096 | B1 * | 3/2005 | Geissler | ............... | B23K 9/1056 |
| | | | | | 363/53 |
| 6,987,242 | B2 * | 1/2006 | Geissler | ............... | B23K 9/1062 |
| | | | | | 363/142 |
| 7,049,546 | B2 * | 5/2006 | Thommes | ............. | H02M 5/458 |
| | | | | | 219/130.21 |
| 7,235,759 | B2 * | 6/2007 | Geissler | ................ | B23K 13/08 |
| | | | | | 363/142 |
| 8,269,141 | B2 * | 9/2012 | Daniel | .................... | B23K 9/09 |
| | | | | | 219/130.1 |
| 8,785,816 | B2 * | 7/2014 | Kooken | ............... | B23K 9/1043 |
| | | | | | 219/130.1 |
| 9,381,592 | B2 * | 7/2016 | Schartner | ............ | H02M 1/4225 |
| 9,647,555 | B2 * | 5/2017 | Kooken | ............. | H02M 1/4225 |
| 9,808,881 | B2 * | 11/2017 | Madsen | ............... | B23K 9/1006 |
| 11,839,939 | B2 * | 12/2023 | Vogel | ..................... | H02M 7/44 |
| 2003/0052106 | A1 * | 3/2003 | Albrecht | ............... | B23K 9/1018 |
| | | | | | 219/130.1 |
| 2006/0011595 | A1 * | 1/2006 | Daniel | .................... | B23K 9/1006 |
| | | | | | 219/130.1 |
| 2006/0138112 | A1 * | 6/2006 | Geissler | ............... | B23K 9/1043 |
| | | | | | 219/130.1 |
| 2006/0175313 | A1 * | 8/2006 | Kooken | ............... | B23K 9/1075 |
| | | | | | 219/130.1 |
| 2006/0213890 | A1 * | 9/2006 | Kooken | ................ | B23K 9/095 |
| | | | | | 219/130.21 |
| 2006/0226130 | A1 * | 10/2006 | Kooken | ............... | H02M 3/1584 |
| | | | | | 219/130.1 |
| 2006/0243716 | A1 * | 11/2006 | Stava | ..................... | B23K 9/093 |
| | | | | | 219/130.5 |
| 2007/0051712 | A1 * | 3/2007 | Kooken | ............... | B23K 9/1043 |
| | | | | | 219/130.1 |
| 2008/0084721 | A1 * | 4/2008 | Miramonti | ............ | H02M 3/157 |
| | | | | | 363/89 |
| 2010/0006551 | A1 * | 1/2010 | Geissler | ............. | H02M 1/4208 |
| | | | | | 219/130.1 |
| 2010/0078410 | A1 * | 4/2010 | Salsich | ................ | B23K 10/006 |
| | | | | | 219/121.55 |
| 2010/0308782 | A1 * | 12/2010 | Werle | .................. | H02M 3/1582 |
| | | | | | 323/282 |
| 2010/0309697 | A1 * | 12/2010 | Werle | .................. | H02M 3/1582 |
| | | | | | 323/305 |
| 2014/0021179 | A1 * | 1/2014 | Schartner | ............. | B23K 9/1075 |
| | | | | | 219/130.1 |
| 2014/0021180 | A1 * | 1/2014 | Vogel | .................. | H02M 7/4833 |
| | | | | | 219/130.1 |
| 2014/0268893 | A1 * | 9/2014 | Henry | .................. | B23K 9/1006 |
| | | | | | 363/17 |
| 2014/0374397 | A1 * | 12/2014 | Vogel | .................. | H02M 7/4833 |
| | | | | | 219/130.1 |
| 2015/0014290 | A1 * | 1/2015 | Kooken | ............... | B23K 9/1043 |
| | | | | | 219/130.1 |
| 2015/0053660 | A1 * | 2/2015 | Schartner | ............. | B23K 9/1062 |
| | | | | | 219/130.1 |
| 2015/0060426 | A1 * | 3/2015 | Schartner | ............... | B23K 9/173 |
| | | | | | 219/130.21 |
| 2016/0129514 | A1 * | 5/2016 | Schartner | ................ | B23K 9/09 |
| | | | | | 219/130.4 |
| 2016/0129519 | A1 * | 5/2016 | Matiash | .................... | H01F 5/02 |
| | | | | | 219/130.1 |
| 2016/0129520 | A1 * | 5/2016 | Schwartz | ........... | H05K 7/20136 |
| | | | | | 219/130.1 |
| 2016/0133378 | A1 * | 5/2016 | Altekruse | ............ | H01F 27/2876 |
| | | | | | 336/60 |
| 2016/0175968 | A1 * | 6/2016 | Madsen | ................ | B23K 9/1043 |
| | | | | | 219/130.21 |
| 2016/0256950 | A1 * | 9/2016 | Madsen | ................. | B23K 9/095 |
| 2018/0056426 | A1 * | 3/2018 | Batzler | ................. | B23K 9/1081 |
| 2020/0101554 | A1 * | 4/2020 | Vogel | .................... | B23K 9/0953 |
| 2022/0295832 | A1 * | 9/2022 | Belcher | ..................... | C12H 1/14 |

\* cited by examiner

SYSTEMS, METHODS, AND APPARATUS FOR PRE- REGULATOR CONTROL IN WELDING-TYPE POWER SUPPLIES

TECHNICAL FIELD

The present disclosure generally relates to welding-type power supplies and, more particularly, to pre-regulator control in welding-type power supplies.

BACKGROUND

Conventional welding power supplies convert an input power (e.g., mains power) to an output power appropriate for welding-type operations and/or welding-type components (e.g., welding torches). Pre-regulator circuits are sometimes used to regulate an input voltage of the input power to some pre-regulated voltage level that is always the same, regardless of the input voltage. In some power supplies, the pre-regulator may be disabled during an idle or sleep mode.

Limitations and disadvantages of conventional and traditional approaches will become apparent to one of skill in the art, through comparison of such systems with the present disclosure as set forth in the remainder of the present application with reference to the drawings.

SUMMARY

The present disclosure is directed to systems and methods for pre-regulator control in welding-type power supplies, for example, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

BRIEF DESCRIPTION OF THE DRAWINGS

The figures are not necessarily to scale. Where appropriate, the same or similar reference numerals are used in the figures to refer to similar or identical elements.

DETAILED DESCRIPTION

Preferred examples of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As used herein, the terms "about" and/or "approximately," when used to modify or describe a value (or range of values), position, orientation, and/or action, mean reasonably close to that value, range of values, position, orientation, and/or action. Thus, the examples described herein are not limited to only the recited values, ranges of values, positions, orientations, and/or actions but rather should include reasonably workable deviations.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type power refers to power suitable for welding, cladding, brazing, plasma cutting, induction heating, CAC-A and/or hot wire welding/preheating (including laser welding and laser cladding), carbon arc cutting or gouging, and/or resistive preheating.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Some examples of the present disclosure relate to a welding-type power supply, comprising power conversion circuitry configured to convert an input power to a welding-type output power, the power conversion circuitry comprising a pre-regulator circuit configured to produce a pre-regulator output voltage, and control circuitry configured to control the pre-regulator circuit to provide the pre-regulator output voltage at two or more regulated levels based on one or more parameters.

In some examples, the one or more parameters comprise the input power, a rectified input power, the pre-regulator output voltage, a pre-regulated output current, a selected welding-type process, the welding-type output power, an auxiliary output power, or a user selected output power. In some examples, the control circuitry is configured to control the pre-regulator circuit to provide a service mode level of the pre-regulator output voltage in response to one or more of a service mode selection, a service tool communication, or the input power, or a rectified input power, being in a service mode range. In some examples, the control circuitry is configured to control the pre-regulator circuit to provide an idle amount of the pre-regulator output voltage during an idle mode. In some examples, the pre-regulator circuit includes one or more controllable circuit elements, the control circuitry configured to control the one or more controllable circuit elements via one or more control signals. In some examples, the pre-regulator circuit comprises one or more of a boost converter, a stacked boost converter, a buck converter, or a boost-buck converter. In some examples, the input power comprises an AC input power, and wherein the power conversion circuitry further comprises an input circuit configured to receive the AC input power, convert the AC input power to a DC input power, and provide the DC input power to the pre-regulator circuit, and an output circuit configured to receive the pre-regulator output voltage and convert the pre-regulator output voltage to the welding-type output power. In some examples, the input circuit comprises a rectifier circuit, the DC input power comprises the rectified input power, and the output circuit comprises an inverter circuit. In some examples, the power conversion circuitry further comprises an auxiliary output circuit configured to receive the pre-regulator output voltage and convert the pre-regulator output voltage to an auxiliary power output.

Some examples of the present disclosures relate to a welding-type power supply, comprising power conversion circuitry configured to convert an input power to a welding-type output power, the power conversion circuitry comprising a pre-regulator circuit configured to produce a pre-regulator output voltage, and control circuitry configured to control the pre-regulator circuit to provide the pre-regulator output voltage at two or more levels based on one or more parameters while the power conversion circuitry is producing the welding-type output.

In some examples, the one or more parameters comprise the input power, a rectified input power, the pre-regulator output voltage, a pre-regulated output current, a selected welding-type process, the welding-type output power, an auxiliary output power, or a user selected output power. In some examples, the control circuitry is configured to disable the pre-regulator circuit in response to the input power, or a rectified input power, being greater than a threshold. In some examples, the pre-regulator circuit includes one or more controllable circuit elements, the control circuitry configured to control the one or more controllable circuit elements via one or more control signals. In some examples, the pre-regulator circuit comprises one or more of a boost converter, a stacked boost converter, a buck converter, or a boost-buck converter. In some examples, the input power comprises an AC input power, and the power conversion circuitry further comprises an input circuit configured to receive the AC input power, convert the AC input power to a DC input power, and provide the DC input power to the pre-regulator circuit, and an output circuit configured to receive the pre-regulator output voltage and convert the pre-regulator output voltage to the welding-type output power. In some examples, the input circuit comprises a rectifier circuit, the DC input power comprises the rectified input power, and the output circuit comprises an inverter circuit. In some examples, the power conversion circuitry further comprises an auxiliary output circuit configured to receive the pre-regulator output voltage and convert the pre-regulator output voltage to an auxiliary power output.

Some examples of the present disclosure relate to a method of operating a welding-type power supply when the welding-type power supply is producing welding-type output power, comprising receiving an input power at a pre-regulator circuit of the welding-type power supply, providing a regulated input power, via the pre-regulator circuit, to an output circuit of the welding-type power supply, providing an unregulated input power, via the pre-regulator circuit, to the output circuit in response to one or more parameters.

In some examples, the one or more parameters comprise the input power, a source power, the pre-regulator output voltage, a pre-regulator output current, a selected welding-type process, a welding-type output power, an auxiliary output power, or a user selected output power. In some examples, providing the regulated input power via the pre-regulator circuit comprises controlling one or more controllable circuit elements of the pre-regulator circuit via control circuitry, and wherein providing the unregulated input power comprises ceasing to control the one or more controllable circuit elements via the control circuitry in response to the input power, or a source power, being greater than a threshold.

Some examples of the present disclosure relate to a welding-type power supply with a pre-regulator circuit configured to provide a pre-regulated direct current (DC) bus at two or more voltage levels, responsive to various operating conditions. In some examples, the pre-regulator circuit may be configured to provide a pre-regulated DC bus voltage at one voltage level for certain input line voltages, and at another voltage level for other input line voltages. In some examples, the pre-regulator circuit may be configured to provide a DC bus voltage at one voltage level for certain weld processes, and at another voltage level for other weld processes. In some examples, the pre-regulator circuit may be configured to provide a pre-regulated DC bus voltage for certain input line voltages and/or weld processes, and an unregulated DC bus voltage for other input line voltages and/or weld processes, while the welding-type power supply is ready to produce and/or producing welding-type power (e.g., not in idle/sleep mode). In some examples, the pre-regulator circuit may be configured to provide a pre-regulated DC bus at a service voltage in response to detecting a service mode of operation, and/or at an idle voltage in response to detecting an idle mode of operation.

In conventional power supplies, and during normal operation (e.g., not in startup or idle/sleep), the pre-regulator circuit is configured to provide a single pre-regulated bus voltage at a predetermined level that is greater than the peak of all expected input line voltages. For example, a power supply rated for an input voltage range between 208V and 575V may have a pre-regulator circuit configured to provide a pre-regulated bus voltage from 920-940 VDC. In such an example, the pre-regulated bus voltage will be maintained between 920 VDC and 940 VDC while the pre-regulator is enabled, regardless of whether the input voltage is 208V, 575V, or some voltage in between. The consistent pre-regulated bus voltage allows for an optimized design of an output circuit of the power supply, because the designers always know what the pre-regulated bus voltage will be, within a certain tolerance range, regardless of the input voltage.

However, by providing a pre-regulated bus at one voltage for certain input voltages, and at another voltage for other input voltages, power supplies using disclosed example pre-regulator circuits are more efficient than power supplies having conventional pre-regulator circuits. In some examples of the present disclosure, a pre-regulator circuit is configured to provide a DC bus pre-regulated to a first voltage (e.g., 750 VDC to 800 VDC, 10-20% above input voltage, etc.) when the magnitude of the input voltage is at a first level and/or in a first range (e.g., nominally 208-460V alternating current (AC)), and/or to provide a DC bus pre-regulated to a second voltage (e.g., 920-940 VDC, 5-10% above input voltage, 10-20% above input voltage, etc.) when the magnitude of the input voltage is at a second level and/or in a second range (e.g., nominally 575 VAC). Additionally, or alternatively, the pre-regulator may be disabled entirely, thereby resulting in an unregulated DC bus, when the magnitude of the input voltage is at a third value and/or in a third range.

Advantageously, a pre-regulator configured to provide two or more pre-regulated DC bus voltages, and/or an unregulated DC bus for certain input voltages may be more efficient, with lower power losses (e.g., switching losses). The pre-regulator circuit (and/or output circuit(s)) suffers power losses (e.g., switching losses) every time a power semiconductor of is switched on and/or off. The power losses may increase as current and/or voltage in the circuit (e.g., on the DC bus) increases. In conventional systems, the pre-regulator circuit is configured to always provide a pre-regulated bus voltage at a magnitude greater than expected input voltage, which may produce excessive power losses. The pre-regulator of the present disclosure substantially reduces these power losses by allowing the pre-regulator to reduce the pre-regulated bus voltage (e.g., from 900 VDC to 800 VDC) when operating from one of the lower nominal input line voltages (e.g., 208 VAC or 230 VAC). Additionally, reducing the DC bus voltage may reduce voltage stress on various components of the power supply (e.g., the power semiconductors, insulation, DC bus capacitors, etc.) which may improve overall reliability of the welding power supply.

The pre-regulated bus voltage may also be determined based on other inputs (e.g., selected weld process, desired weld output voltage and/or current, actual weld output voltage and/or current). For example, the pre-regulator may be configured to generate a higher pre-regulated DC bus voltage for certain weld processes (e.g., shielded metal arc welding (SMAW)) and a lower pre-regulated DC bus voltage for other weld processes (e.g., gas tungsten arc welding (GTAW) or gas metal arc welding (GMAW)). Controlling the pre-regulator output based on weld processes and/or other factors likewise enables improved overall efficiency of the welding power supply and/or reduced voltage stress for certain operating conditions. This improved efficiency in the combined operation of the pre-regulator and output circuit may outweigh any optimization reduction in the output circuit alone.

In some examples, the pre-regulator may also be configured to provide a pre-regulated DC bus at a lower voltage level based on a status and/or operating mode of the welding power supply. For example, the pre-regulated bus may be set to some minimum voltage when the welding power supply is in an idle and/or sleep mode so that various housekeeping power supplies, auxiliary power supplies, and/or other circuits that are powered from the DC bus can continue to operate during idle and/or sleep mode. As another example, the pre-regulated bus may be set to a service and/or diagnostic voltage level when the welding power supply is in a service and/or diagnostic mode, so that there is some power for a service technician to perform service and/or diagnostic operations with minimal risk of damage to the welding power supply. In some examples, the welding-type power supply may be configured to provide an indication (e.g., via a user interface) of the service and/or diagnostic voltage level when in a service and/or diagnostic mode, so as to inform the service technician, for example.

Figure 1:
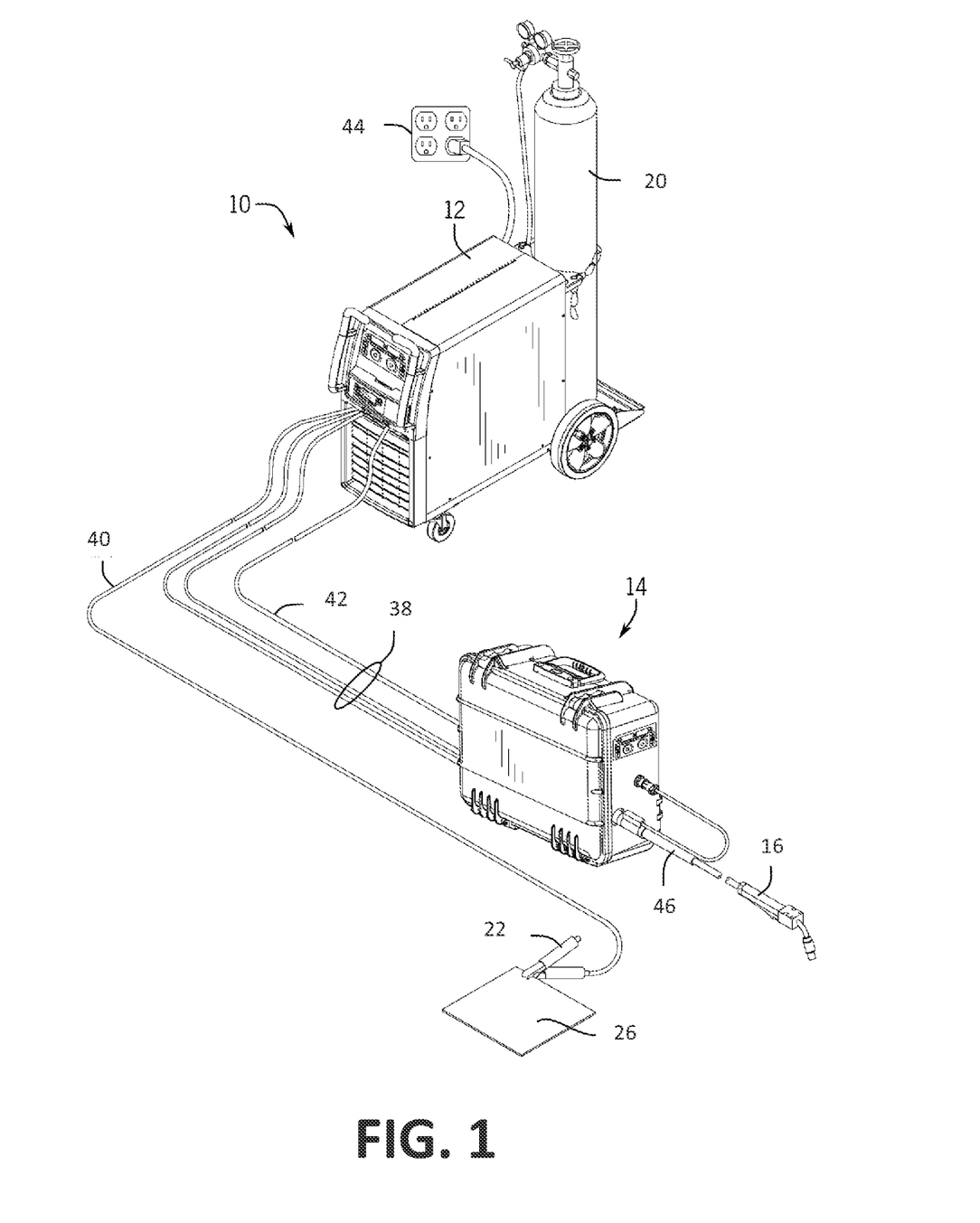
FIG. 1 illustrates an example of a welding-type system, in accordance with aspects of this disclosure.
Figure 2:
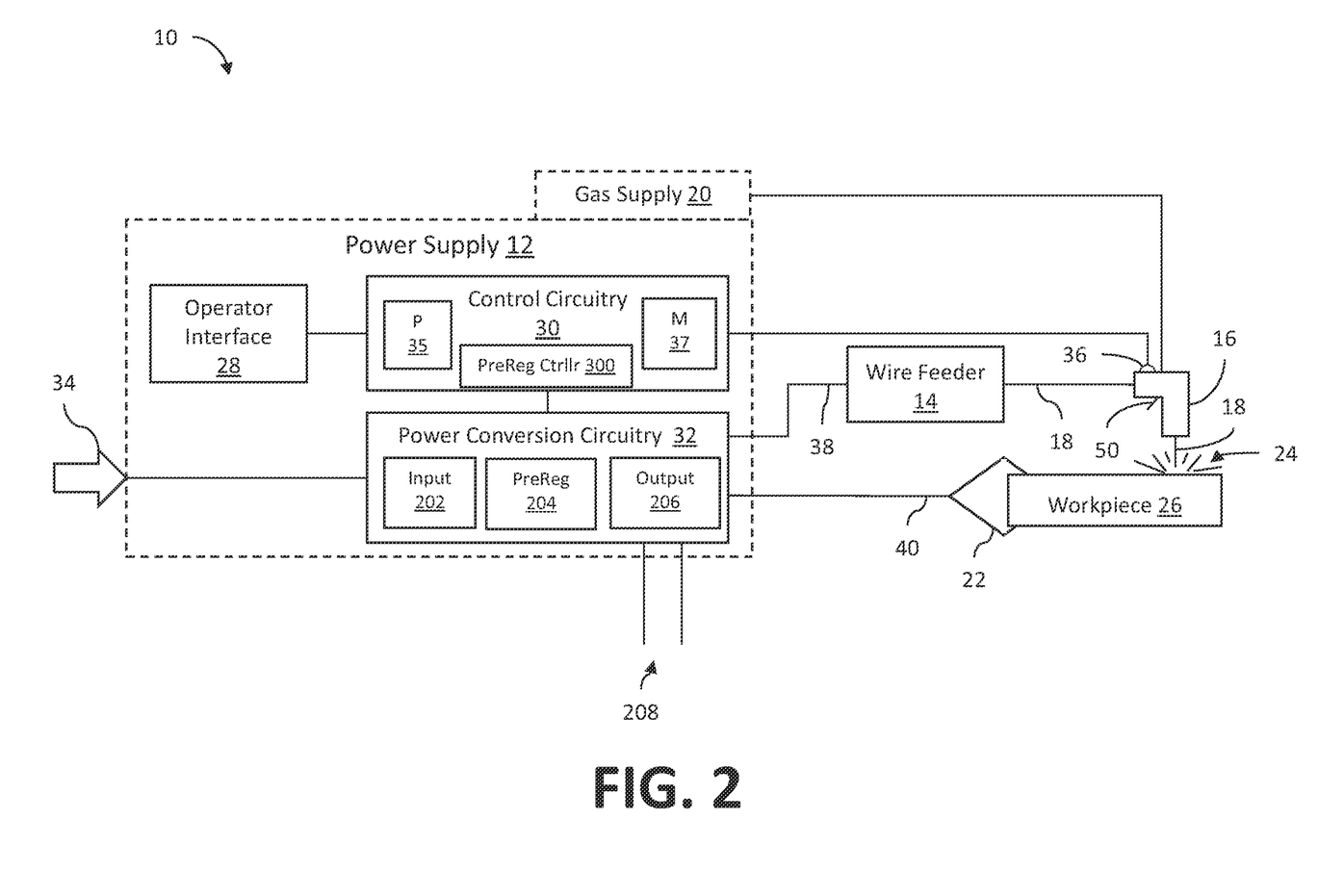
FIG. 2 is a block diagram of the example welding-type system of FIG. 1, in accordance with aspects of this disclosure.

FIGS. 1 and 2 show a perspective view and block diagram view, respectively, of an example of a welding-type system 10. It should be appreciated that, while the example welding-type system 10 shown in FIGS. 1 and 2 may be described as a gas metal arc welding (GMAW) system, the presently disclosed system may also be used with other arc welding processes (e.g., flux-cored arc welding (FCAW), gas shielded flux-cored arc welding (FCAW-G), gas tungsten arc welding (GTAW), submerged arc welding (SAW), shielded metal arc welding (SMAW), or similar arc welding processes) or other metal fabrication systems, such as plasma cutting systems, induction heating systems, and so forth.

In the example of FIG. 1, the welding-type system 10 includes a welding-type power supply 12, a welding wire feeder 14, a gas supply 20, and a welding torch 16. The welding-type power supply 12 generally supplies power for the welding-type system 10 and/or other various accessories. In the example of FIG. 1, the welding-type power supply 12 is coupled to the welding wire feeder 14 via one or more weld cables 38, as well as coupled to a work piece 26 using a lead cable 40 having a clamp 22. In the illustrated example, the welding wire feeder 14 is coupled to the welding torch 16 via coupler 46 in order to supply welding wire and/or welding-type power to the welding torch 16 during operation of the welding-type system 10. In some examples, the welding-type power supply 12 may couple and/or directly supply welding-type power to the welding torch 16. In the illustrated example, the power supply 12 is separate from the wire feeder 14, such that the wire feeder 14 may be positioned at some distance from the power supply 12 near a welding location. However, it should be understood that the wire feeder 14, in some examples, may be integral with the power supply 12. In some examples, the wire feeder 14 may be omitted from the system 10 entirely.

In the examples of FIGS. 1 and 2, the welding-type system 10 includes a gas supply 20 that may supply a shielding gas and/or shielding gas mixtures to the welding torch 16. A shielding gas, as used herein, may refer to any gas or mixture of gases that may be provided to the arc and/or weld pool in order to provide a particular local atmosphere (e.g., shield the arc, improve arc stability, limit the formation of metal oxides, improve wetting of the metal surfaces, alter the chemistry of the weld deposit, and so forth). In the example of FIG. 1, the gas supply 20 is coupled to the welding torch 16 through the wire feeder 14 via a gas conduit 42 that is part of the weld cables 38 from the welding-type power supply 12. In such an example, the power supply 12 and/or the welding wire feeder 14 may regulate the flow of gas from the gas supply 20 to the welding torch 16. In the example of FIG. 2, the gas supply 20 is depicted as coupled directly to the welding torch 16 for the sake of explanation.

In the example of FIG. 2, the wire feeder 14 supplies a wire electrode 18 (e.g., solid wire, cored wire, coated wire) to the torch 16. The gas supply 20, which may be integral with or separate from the power supply 12, supplies a gas (e.g., CO2, argon) to the torch 16. In some examples, no gas supply 20 may be used. The welding-type power supply 12 may power the welding wire feeder 14 that, in turn, powers the welding torch 16, in accordance with demands of the welding-type system 10. The lead cable 40 terminating in the clamp 22 couples the welding-type power supply 12 to the work piece 26 to close the circuit between the welding-type power supply 12, the work piece 26, and the welding torch 16. An operator may engage a trigger 50 of the torch 16 to initiate an arc 24 between the electrode 18 and a work piece 26. In some examples, engaging the trigger 50 of the torch 16 may initiate a different welding-type function, instead of an arc 24.

In the example of FIG. 2, the welding-type power supply 12 includes an operator interface 28, control circuitry 30, and power conversion circuitry 32. In some examples, the welding-type system 10 may receive weld settings from the operator via the operator interface 28 provided on the power supply 12 (and/or power source housing, such as on a front panel of the power source housing, for example). The weld settings may relate to the type of welding-type power and/or welding-type process desired, for example. In the example of FIG. 2, the operator interface 28 is coupled to the control circuitry 30, and may communicate the weld settings to the control circuitry 30 via this coupling.

Figure 3:
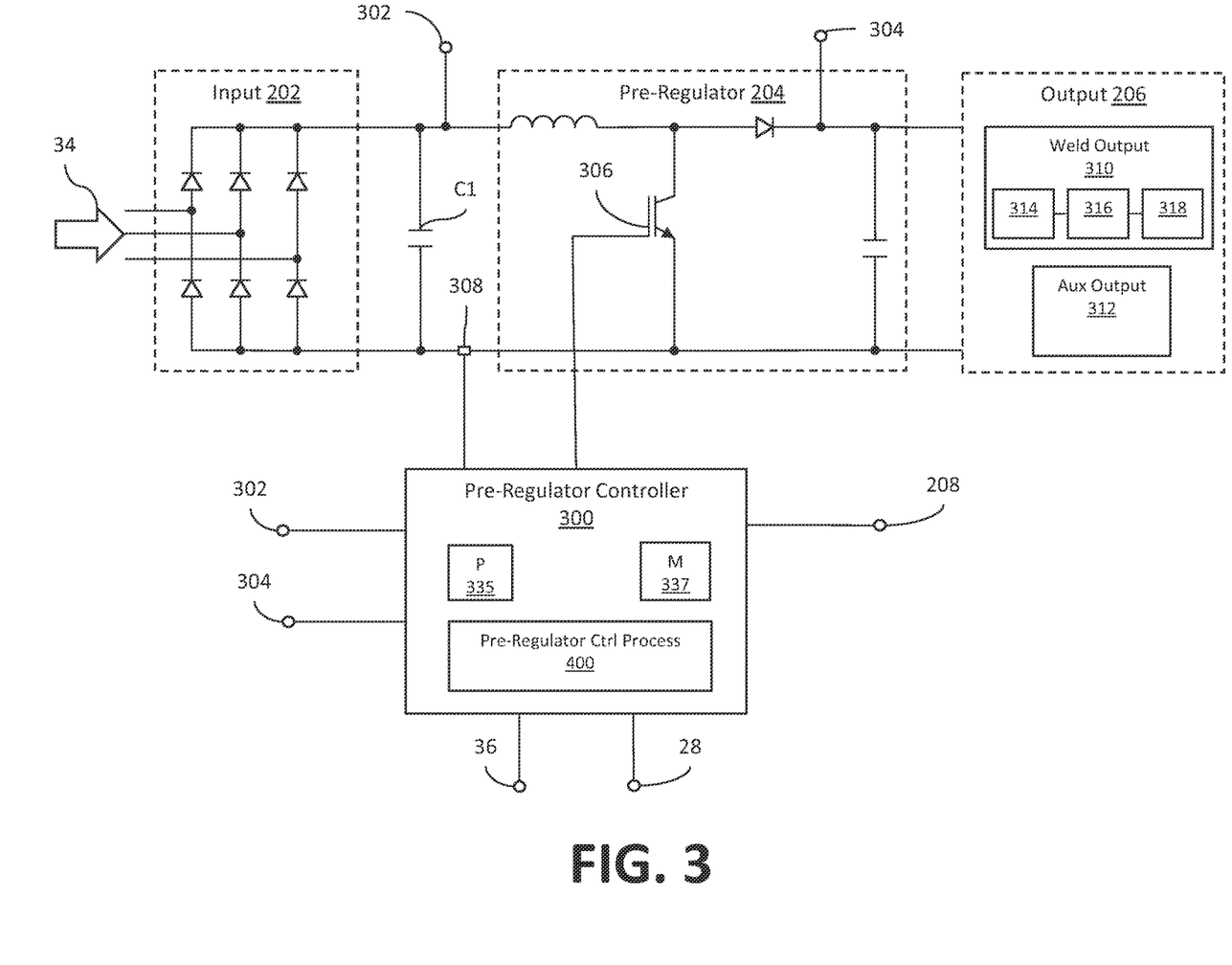
FIG. 3 is a block diagram of a pre-regulator control circuit, in accordance with aspects of this disclosure.

In the example of FIG. 2, the welding-type power supply 12 includes power conversion circuitry 32 that receives input power from a power source (e.g., the AC power grid, an engine/generator set, or a combination thereof), conditions the input power, and provides DC and/or AC welding-type output power via the weld cable(s) 38 and/or lead cable 40. In the examples of FIGS. 2 and 3, the source of electrical power is indicated by arrow 34. In some examples, the source may be a power grid, an engine-driven generator, a solar generator, batteries, fuel cells, and/or other sources. In some examples, the input power received from the source may be an alternating current (AC) voltage (V) with one or more magnitudes (e.g., 120/240 VAC, 208-575 VAC, etc). In some examples, the input power may be single phase AC power, three phase AC power (e.g., at 50/60 hertz (HZ)), and/or direct current (DC) power such as from a battery and/or other electrical storage device. In the example of FIG. 1, the source is an electrical outlet 44. In the example of FIG. 3, the input power received from the source 34 is a three phase input power.

In the example of FIG. 2, the control circuitry 30 is coupled to the power conversion circuitry 32. In some examples, the control circuitry 30 operates to control the conversion circuitry 32, so as to ensure the conversion circuitry 32 generates the appropriate welding-type power for carrying out the desired welding-type operation. In some examples, the control circuitry 30 may control the power conversion circuitry 32 to produce an appropriate and/or desired current and/or voltage of the welding-type power supplied to the torch 16, as selected, for example, by an operator through the operator interface 28.

In the example of FIG. 2, the control circuitry comprises one or more processors 35 and/or memory 37. The processor(s) 35 may include one or more microprocessors, such as one or more "general-purpose" microprocessors, one or more special-purpose microprocessors and/or application specific integrated circuits (ASICS), or some combination thereof. For example, the processor(s) may include one or more reduced instruction set (RISC) processors (e.g., Advanced RISC Machine (ARM) processors), one or more digital signal processors (DSPs), and/or other appropriate processors. The one or more processors 35 may use data stored in the memory 37 to execute control algorithms. The data stored in the memory 37 may be received via the operator interface 28, one or more input/output ports, a network connection, and/or be preloaded prior to assembly of the control circuitry 30. In the example of FIG. 2, the control circuitry further comprises a pre-regulator controller 300, further discussed below. In some examples, the pre-regulator controller 300 may make use of the processors 35 and/or memory 37.

The control circuitry 30 may monitor the current and/or voltage of the arc 24 using one or more sensors 36 positioned on, within, along, and/or proximate to the wire feeder 14, weld cable 38, and/or torch 16. The one or more sensors 36 may comprise, for example, current sensors, voltage sensors, impedance sensors, temperature sensors, acoustic sensors, trigger sensors, and/or other appropriate sensors. In some examples, the control circuitry 30 may determine and/or control the power conversion circuitry 32 to produce an appropriate power output, arc length, and/or electrode extension based at least in part on feedback from the sensors 36.

The power conversion circuitry 32 may include circuit elements (e.g., transformers, rectifiers, capacitors, inductors, diodes, transistors, switches, and so forth) capable of converting the AC input power to a direct current electrode positive (DCEP) output, direct current electrode negative (DCEN) output, DC variable polarity, and/or a variable balance (e.g., balanced or unbalanced) AC output, as dictated by the demands of the welding-type system 10 (e.g., based on the type of welding process performed by the welding-type system 10, and so forth). In the example of FIGS. 2-3, the power conversion circuitry 32 includes an input circuit 202, a pre-regulator circuit 204, and an output circuit 206. As shown, the power conversion circuitry 32 provides auxiliary output power (e.g., from an auxiliary portion of output circuit 206) via auxiliary output leads 208, and welding output power (e.g., from a weld portion of output circuit 206) to the wire feeder 14 and workpiece 26 via weld cable(s) 38 and/or lead cable 40.

FIG. 3 shows more detail of the power conversion circuitry 32 and pre-regulator controller 300. In the example of FIG. 3, the input circuit 202 comprises a rectifier circuit, the pre-regulator circuit 204 comprises a boost converter, and the output circuit 206 comprises a weld output circuit 310 (e.g., to provide welding-type output power) and an auxiliary output circuit 312 (e.g., to provide 115 VAC and/or other auxiliary output power). While the input circuit 202 shown in FIG. 3 is configured for three phase power, in some examples the input circuit 202 may instead be configured for two phase power or single phase power. While the pre-regulator circuit 204 shown in FIG. 3 comprises a single boost converter, in some examples, the pre-regulator circuit 204 may additionally, or alternatively, comprise one or more boost converters, stacked boost converters, buck converters, boost-buck converters, and/or other chopper circuits. While the output circuit 206 shown in FIG. 3 comprises a weld output circuit 310 and an auxiliary output circuit 312, in some examples, the output circuit 206 may additionally, or alternatively, comprise one or more other output circuits, such as one or more "housekeeping" power output circuits (e.g., to provide power for the wire feeder 14, operator interface 28, and/or control circuitry 37).

In the example of FIG. 3, the weld output circuit 310 includes an inverter stage 314, a transformer stage 316, and an output stage 318. As shown, the inverter stage 314 receives power (e.g., DC power) from the pre-regulator bus 304 and inverts the power to AC power. The transformer stage 316 provides the AC power to the output circuit 318 via one or more transformers. The output stage 318 converts the AC power to DC power for delivery to the welding-type components. In some examples, the output stage 316 comprises a rectifier. In some examples, the inverter stage 314 may be turned off and/or disabled, such that power received from the pre-regulator bus 304 is not inverted to AC power. In some examples, the inverter stage 314 may include on or more controllable circuit elements that are controlled by the controlled circuitry 30 (and/or other control circuitry) to control operation of the inverter stage 314.

In the example of FIG. 3, the input circuit 202 is configured to receive input power from a power source, as indicated by arrow 34. The input power is typically AC power, but may also be DC power in some examples. In either case, the input circuit 202 is configured to ensure that the pre-regulator circuit 204 receives the input power in a form on which the pre-regulator circuit 204 can operate. In the example of FIG. 3, this means that the input circuit 202 receives either AC or DC input power, and rectifies the input power to ensure the pre-regulator circuit 204 receives DC power. A capacitor C1 positioned between the input circuit 202 and pre-regulator circuit 204 is configured to help smooth and/or filter the rectified DC power. In some examples, one or more additional, or alternative, filters may be used, such as electromagnetic interference (EMI) filters and/or inductors. In some examples, the filter may be removed entirely. As shown, the rectified and filtered DC power is provided to the pre-regulator circuit 204 on input bus 302.

In the example of FIG. 3, the pre-regulator circuit 204 is configured to modify the rectified and filtered DC power provided on input bus 302. More particularly, the boost converter pre-regulator circuit 204, as shown in FIG. 3, is configured to boost the voltage of the DC power provided on input bus 302, and provide the boosted power on pre-regulator bus 304 for the output circuit 206. In some examples, the pre-regulator circuit 204 may instead reduce (and/or buck, step down, etc.) the voltage of the DC power provided on input bus 302. The output circuit 206 uses the pre-regulated power on the pre-regulator bus 304 to provide the various outputs of the welding-type power supply 12. In some examples, the voltage of the output circuit 206 may be proportional to the voltage of the pre-regulator bus 304.

In the example of FIG. 3, the pre-regulator circuit 204 includes a controllable circuit element 306. In some examples, the pre-regulator circuit 204 may include more than one controllable circuit element 306. In the example of FIG. 3, the controllable circuit element 306 is a transistor. In some examples, the transistor may comprise any suitable transistor, such as, for example MOSFET, JFET, IGBT, BJT, etc. In some examples, the controllable circuit element 306 may instead comprise a switch and/or relay.

As shown, the controllable circuit element 306 is in electrical communication with the pre-regulator controller 300. The controllable circuit element 306 is configured to change states (e.g., activate/deactivate, open/close, and/or turn off/on) in response to one or more control signals received from the pre-regulator controller 300. In some examples, the pre-regulator controller 300 may be configured to control operation of the pre-regulator circuit 204 via the controllable circuit element 306 when regulating the input power (and/or providing regulated power to the pre-regulator bus 304). By adjusting characteristics (e.g., duty cycle, phase, frequency, etc.) of one or more control signals delivered to the controllable circuit element 306, the pre-regulator controller 300 may change how and/or when the controllable circuit element 306 is activated and/or deactivated, which may thereby change the operation of the pre-regulator circuit 204 and/or the characteristics (e.g., voltage magnitude, current magnitude, etc.) of the power generated by the pre-regulator circuit 204 on the pre-regulator bus 304. For example, the pre-regulator controller 300 may control the controllable circuit element 306 using a pulse width modulated (PWM) control signal having a duty cycle, and increasing the duty cycle of the control signal may increase the boost of the pre-regulator circuit 204, generating a higher voltage pre-regulator bus 304, while decreasing the duty cycle of the control signal may decrease the boost of the pre-regulator circuit 204, generating a lower voltage pre-regulator bus 304. In some examples, the pre-regulator circuit 204 may be considered enabled (and/or on, operational, regulating, etc.) when the duty cycle is greater than 0% (or between 0% and 100%), and/or disabled (and/or off, inoperative, not regulating, etc), when the duty cycle is 0% (or 0% or 100%).

In the example of FIG. 3, the pre-regulator controller comprises one or more processors 335 and/or memory 337. In some examples, the one or more processors 335 and/or memory 337 may include and/or be part of the one or more processors 35 and/or memory 37 of the control circuitry 300. As shown, the pre-regulator controller 300 receives various inputs for control of the pre-regulator circuit 204. As shown, inputs are received from: the input bus 302, the pre-regulator bus 304, the operator interface 28, auxiliary output leads 208, a sensor 308 positioned between the input circuit 202 and pre-regulator circuit 204, and the sensor 36. In some examples, the pre-regulator controller 300 may receive and/or use more or less inputs. These inputs may provide various information to the pre-regulator controller 300, such as, for example, a selected weld process, an actual output current and/or voltage of the welding-type power supply 12 (and/or weld output circuit 310 and/or auxiliary output circuit 312), a current through the pre-regulator circuit 204, a voltage and/or current of the input bus 302, a voltage and/or current of the pre-regulator bus 304, a mode of operation, and/or other information. This information may be used by a pre-regulator control process 400 of the pre-regulator controller 300 to control the pre-regulator circuit 204 (e.g., via the controllable circuit element 306).

Figure 4:
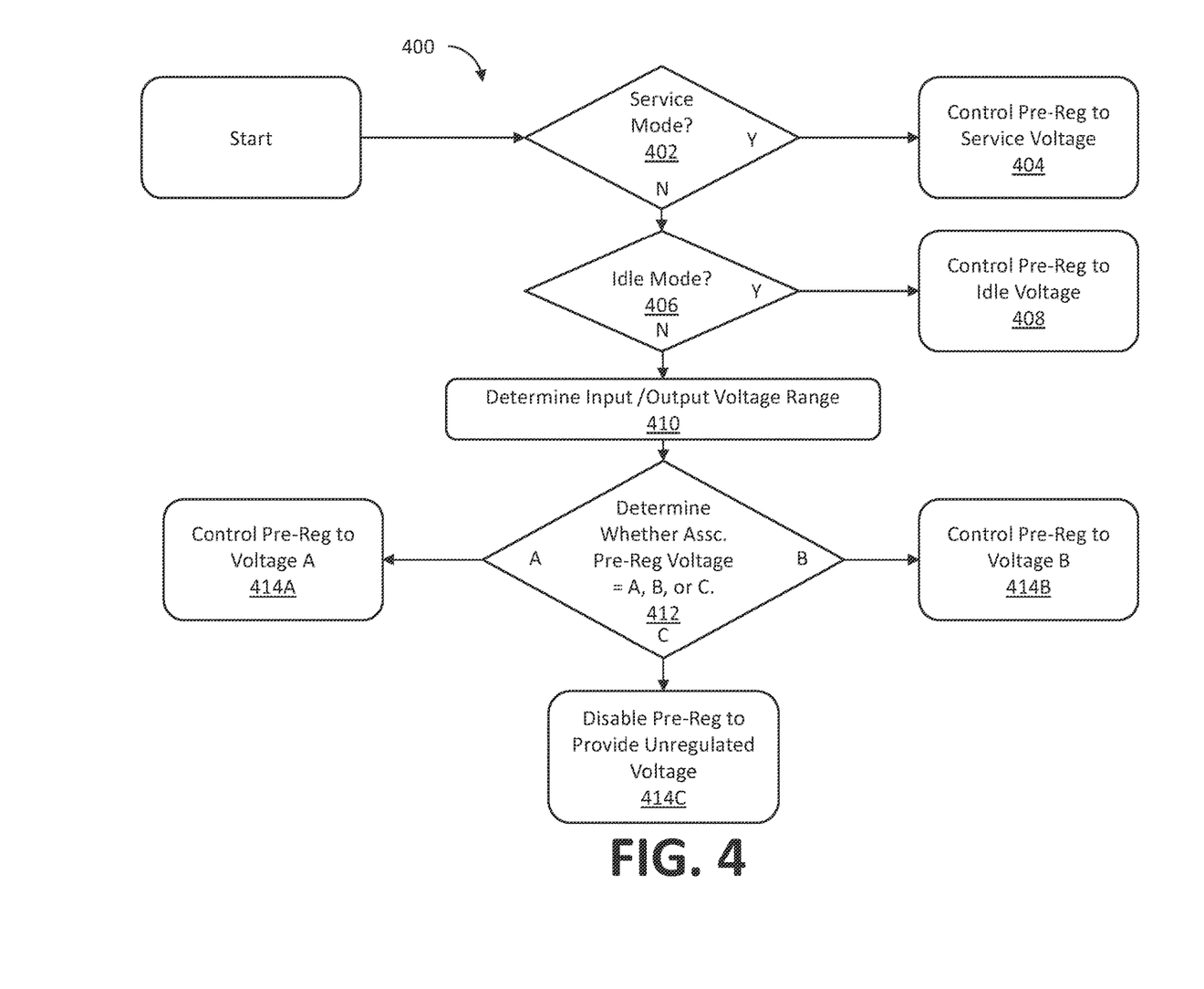
FIG. 4 is a flowchart representative of a pre-regulator control process, in accordance with aspects of this disclosure.

FIG. 4 is a flowchart representative of the pre-regulator control process 400. In some examples, the pre-regulator controller 300 may use the pre-regulator control process 400 to control the pre-regulator circuit 204 of FIG. 3. In some examples, some or all of the pre-regulator control process 400 may be implemented in machine readable instructions stored in memory 37 (and/or 337) and/or executed by the one or more processors 35 (and/or 335). In some examples, some or all of the pre-regulator control process 400 may be implemented in analog and/or discrete circuitry. The pre-regulator control is configured to control the pre-regulator circuit 204 (e.g., via one or more control signal(s) to the controllable circuit element 306) to provide two or more voltage levels of on the pre-regulator bus 304 based on the inputs of the control circuitry 30 (e.g., such as shown in FIG. 3).

In the example of FIG. 4, the pre-regulator control process 400 begins at block 402, where the pre-regulator control process 400 determines whether the power supply 12 is in a service mode. In some examples, the pre-regulator control process 400 may determine the power supply 12 is in a service mode in response to an operator indication of a service mode (e.g., through a switch and/or some other selection via the operator interface 28). In some examples, the pre-regulator control process 400 may determine the power supply 12 is in a service mode in response to the connection of a service tool (not shown) with the power supply 12 and/or other portions of the welding-type system 10 (e.g., wire feeder 14). As shown, if the pre-regulator control process 400 determines that the power supply 12 is in a service mode, the pre-regulator control process 400 controls the pre-regulator circuit 204 to provide a service level voltage on the pre-regulator bus 304 at block 404. In some examples, the welding-type power supply 12 may be configured to provide an indication (e.g., via operator interface 28) of the service and/or diagnostic voltage level when in a service and/or diagnostic mode, so as to inform the service technician, for example. In some examples, the indication may be through one or more visual indicators (e.g., lights, text, images, videos, etc) and/or audio indicators (e.g., audible speech, audible noise, etc.).

In some examples, the service level voltage may be provided at a first magnitude (and/or in a first range) when the voltage of the power source 34 (and/or on the input bus 302) is at a low magnitude (and/or in a low range), and at a second magnitude when the voltage of the power source 34 (and/or on the input bus 302) is at a high magnitude (and/or in a high range). In some examples, the service level voltage may be between 30 VDC and 100 VDC. In some examples, the service level voltage may be incrementally increase/decreased (e.g., via the operator interface 28) to enable different levels of service mode testing. If the pre-regulator control process 400 determines that the power supply 12 is not in a service mode, the pre-regulator control process 400 proceeds to block 406.

In the example of FIG. 4, the pre-regulator control process 400 determines whether the power supply 12 is in an idle (and/or sleep) mode at block 406. In some examples, the pre-regulator control process 400 may use input from the one or more sensors 36 to determine whether the power supply 12 is in an idle (and/or sleep) mode at block 406. For example, the sensor(s) 36 may provide voltage and/or current information indicative of an idle mode, such as a low voltage and/or power demand (and/or draw, load, etc.) for a certain length of time. As another example, the sensor(s) may provide data indicative of activation of the trigger 50, and the pre-regulator control process 400 may determine the power supply 12 is in an idle mode in response to a certain amount of time elapsing since the last pull of the trigger 50. In some examples, the control circuitry 30 (or some other control circuitry) may control the weld output circuit 310, and disable the weld output circuit 310 during the idle mode, such that the pre-regulator control process 400 determines that the power supply 12 is in idle mode in response to the disabling of the weld output circuit 310.

In the example of FIG. 4, if the pre-regulator control process 400 determines that the power supply 12 is in an idle mode, the pre-regulator control process 400 controls the pre-regulator circuit 204 to provide an idle level voltage on the pre-regulator bus 304 at block 406. In some examples, the idle level voltage may be approximately 400 VDC. In some examples, the idle level voltage may be a first magnitude (and/or in a first range) when the voltage of the power source 34 (and/or on the input bus 302) is at a low magnitude (and/or in a low range), and at a second magnitude when the voltage of the power source 34 (and/or on the input bus 302) is at a high magnitude (and/or in a high range). For example, the idle level voltage may be approximately 400 VDC when the input voltage (and/or voltage of input bus 302) is between 208 V and 460 V, while the idle voltage level may be approximately 700 VDC when the input voltage (and/or voltage of input bus 302) is above 460 V (and/or any other voltage outside of 208-460 V). In some examples, the pre-regulator control process 400 may be configured to disable control of the pre-regulator circuit 204 when the voltage of the power source 34 (and/or on the input bus 302) is at a high magnitude (and/or in a high range), or at some other (e.g., unaccounted for) magnitude, allowing an unregulated voltage to be provided on the pre-regulator bus 304. If the pre-regulator control process 400 determines that the power supply 12 is not in an idle mode, the pre-regulator control process 400 proceeds to block 410.

In the example of FIG. 4, the pre-regulator control process 400 determines an input voltage (and/or input voltage range) of the power source 34 and/or input bus 302 at block 410. In some examples, the pre-regulator control process 400 may determine an input voltage (and/or input voltage range) of the power source 34 and/or input bus 302 in blocks 404 and/or 408 as well, as discussed above. In some examples, the input voltage (and/or input voltage range) of the power source 34 and/or input bus 302 may be determined via direct input to the control circuitry 30, such as shown, for example, in FIG. 3.

In some examples, the pre-regulator control process 400 may also, or alternatively, determine a selected weld process and/or target output voltage (and/or target weld output voltage, target auxiliary output voltage, target weld/auxiliary output voltage range, etc.) at block 410. In some examples, the pre-regulator control process 400 may determine the selected weld process via input from the operator interface 28. In some examples, the pre-regulator control process 400 may determine the target output voltage based on the selected weld process. In some examples, the pre-regulator control process 400 may determine one or more voltages of the pre-regulator bus 304 that are associated with the selected weld process and/or target output voltage. For example, an operator may select a SMAW process, and the pre-regulator control 500 may determine (e.g., through a lookup in memory 37 or via some other process) that the SMAW process requires some particular weld output voltage (e.g., on the weld output circuit 310). In some examples, the target output voltage may be input directly by an operator via the operator interface 28. In some examples, the target output voltage may be determined through a measured (and/or detected) power draw (and/or demand) on the weld output circuit 310 and/or auxiliary output circuit 312.

At block 412 of FIG. 4, the pre-regulator control process 400 determines an appropriate pre-regulator voltage (e.g., to put on the pre-regulator bus 304 via the pre-regulator circuit). In some examples, the pre-regulator control process 400 may determine (e.g., through a lookup in memory 37 or via some other process) the pre-regulator voltage via an association with the input voltage (and/or input voltage range) of the input bus 302 (and/or power source 34). For example, if the input voltage (e.g., of input bus 302) is determined (e.g., at block 410) to be nominally between 208 V and 460 V (e.g., 208, 230, 380, 400, 415, 440, and/or 460 V), the pre-regulator control process 400 may determine the associated pre-regulator voltage is between 750 VDC and 800 VDC. As another example, if the input voltage (e.g., of input bus 302) is determined (e.g., at block 410) to be nominally between 208 V and 460 V the pre-regulator control process 400 may determine the associated pre-regulator voltage to be some percentage (e.g., 10%, 15%, 20%, 25%, etc.) above the input voltage. In some examples, the pre-regulator control process 400 may determine the pre-regulator voltage via an association with the target output voltage and/or selected weld process determined. For example, if the selected weld process is determined (e.g., at block 410) to be a SMAW process the pre-regulator control process 400 may determine the pre-regulator voltage (and/or pre-regulator voltage range) to be a voltage that will enable the power supply 12 to perform the SMAW process. As another example, if the target weld output is determined (e.g., at block 410) to be a weld output voltage required by the SMAW process, the pre-regulator control process 400 may determine the pre-regulator voltage (and/or pre-regulator voltage range) to be a voltage that will enable the weld output circuit 310 to produce that target weld output voltage.

In some examples, the pre-regulator control 500 may come to different determinations at block 412, depending on whether the determination is based on the input voltage or the target weld output voltage (and/or selected weld process). In some examples, the input voltage may be determinative (e.g., when selected as determinative via operator interface 28). In some examples, the target output voltage (and/or selected weld process) may be determinative (e.g., when selected as determinative via operator interface 28). In some examples, the larger of the pre-regulator voltages associated with the input voltage and/or target output voltage (and/or selected weld process) may be determinative.

In the example of FIG. 4, the pre-regulator control process 400 proceeds to block 414A if the associated pre-regulator voltage is determined to be a first magnitude (and/or in a first range). At block 414A, the pre-regulator control process 400 controls the pre-regulator circuit 204 to provide a voltage on the pre-regulator bus 304 at the first magnitude (and/or in the first range). For example, the pre-regulator control process 400 may control the pre-regulator circuit 204 to provide a pre-regulator bus 304 between 750 VDC and 800 VDC when the magnitude of the input voltage (e.g., of input bus 302) is nominally between 208 V and 460 V (e.g., 208, 230, 380, 400, 415, 440, and/or 460 V). As another example, the pre-regulator control process 400 may control the pre-regulator circuit 204 to provide the pre-regulator bus 304 to be some percentage (e.g., 10%, 15%, 20%, 25%, etc.) above the input voltage when the magnitude of the input voltage (e.g., of input bus 302) is nominally between 208 V and 460 V. As another example, the pre-regulator control process 400 may control the pre-regulator circuit 204 to provide the pre-regulator bus 304 between 750 VDC and 800 VDC when a selected weld process (and/or target output voltage) is associated with (and/or requires) a pre-regulator bus 304 between 750 VDC and 800 VDC.

In the example of FIG. 4, the pre-regulator control process 400 proceeds to block 414B if the associated pre-regulator voltage is determined to be a second magnitude (and/or in a second range). At block 414B, the pre-regulator control process 400 controls the pre-regulator circuit 204 to provide a voltage on the pre-regulator bus 304 at the second magnitude (and/or in the second range). For example, the pre-regulator control process 400 may control the pre-regulator circuit 204 to provide a pre-regulator bus 304 between 920 VDC and 940 VDC (and/or between 800 VDC and 940 VDC) when the magnitude of the input voltage (e.g., of input bus 302) is approximately 575 V (and/or above 460 V). As another example, the pre-regulator control process 400 may control the pre-regulator circuit 204 to provide the pre-regulator bus 304 to be some percentage (e.g., 5%, 10%, 15%, etc.) above the input voltage when the magnitude of the input voltage (e.g., of input bus 302) is approximately 575 V (and/or above 460 V). As another example, the pre-regulator control process 400 may control the pre-regulator circuit 204 to provide a pre-regulator bus 304 between 920 VDC and 940 VDC when a selected weld process (and/or target output voltage) is associated with (and/or requires) a pre-regulator bus 304 between 920 VDC and 940 VDC.

In the example of FIG. 4, the pre-regulator control process 400 proceeds to block 414C if the associated pre-regulator voltage is determined to be a third magnitude (and/or in a third range). At block 414C, the pre-regulator control process 400 disables control of the pre-regulator circuit 204, allowing an unregulated voltage to be provided on the pre-regulator bus 304. For example, the pre-regulator control process 400 may disable control of the pre-regulator circuit 204, allowing an unregulated voltage on the pre-regulator bus 304, when the input voltage (e.g., on the input bus 302) is already within a certain tolerance of a voltage associated with (and/or required by, ideal for, etc.) a selected weld process (and/or target output/weld voltage). In such an example, the pre-regulator bus 304 may have a voltage proportional to that of the input bus 302. While this may result in a lower voltage on the pre-regulator bus 304 than if the pre-regulator circuit 204 were enabled, it may be acceptable if the voltage on the input bus 302 is already sufficiently high and/or if the target weld output is sufficiently low. Additionally, the weld output circuit 310 may be configured to operate within certain tolerances (e.g., +−10% to 15%), such that the output circuit 206 can handle a slightly lower pre-regulator bus 304.

While the present apparatus, systems, and/or methods have been described with reference to certain implementations, it will be understood by those skilled in the art that various changes may be made and equivalents may be substituted without departing from the scope of the present apparatus, systems, and/or methods. In addition, many modifications may be made to adapt a particular situation or material to the teachings of the present disclosure without departing from its scope. Therefore, it is intended that the present apparatus, systems, and/or methods not be limited to the particular implementations disclosed, but that the present apparatus, systems, and/or methods will include all implementations falling within the scope of the appended claims.

What is claimed is:

1. A welding-type power supply, comprising:
power conversion circuitry configured to convert an input power to a welding-type output power, the power conversion circuitry comprising: a pre-regulator circuit configured to regulate output voltage at a first voltage level and a second voltage level; and
control circuitry configured to:
control the pre-regulator circuit to regulate the output voltage to the first voltage level when an input voltage or rectified input voltage is within a first range,
control the pre-regulator circuit to regulate the output voltage to the second voltage level when the input voltage or the rectified input voltage is within a second range, and
disable the pre-regulator circuit when the input voltage or the rectified input voltage is within a third range.

2. The power supply of claim 1, wherein the input power comprises a three phase input power, the input voltage comprises a first voltage of the three phase input power, and the rectified input voltage comprises a second voltage of the three phase input power after rectification.

3. The power supply of claim 1, wherein the control circuitry is configured to control the pre-regulator circuit to provide a service mode level of the output voltage at a service level that is less than the first voltage level and the second voltage level in response to selection of a service mode received via an operator interface, a connection of a service tool with the welding-type power supply, or the input voltage, or the rectified input voltage, being in a service mode range that is less than both the first range and the second range.

4. The power supply of claim 1, wherein the control circuitry is configured to control the pre-regulator circuit to provide the output voltage at an idle level that is less than the first voltage level and the second voltage level when the welding-type output power drawn from the power conversion circuitry is less than a power threshold, or a torch activation signal has not been received, for a threshold period of time.

5. The power supply of claim 1, wherein the pre-regulator circuit includes one or more controllable circuit elements, the control circuitry configured to control the one or more controllable circuit elements via one or more first control signals when the input voltage or the rectified input voltage is within the first range, and control the one or more controllable circuit elements via one or more second control signals when the input voltage or the rectified input voltage is within the second range.

6. The power supply of claim 1, wherein the first range is nominally between 208 volts and 460 volts, and the second range is nominally between 460 volts and 600 volts.

7. The power supply of claim 6, wherein the first voltage level is between 750 volts and 800 volts.

8. The power supply of claim 7, wherein the second voltage level is between 920 volts and 940 volts.

9. The power supply of claim 6, wherein the first voltage level is a first percentage amount above the input voltage or the rectified input voltage, and the second voltage level is a second percentage amount above the input voltage or the rectified input voltage.

10. A welding-type power supply, comprising:
power conversion circuitry configured to convert an input power to a welding-type output power, the power conversion circuitry comprising: a pre-regulator circuit configured to produce a pre-regulator output voltage; and
control circuitry configured to:
determine whether the welding-type power supply is operating in an idle mode or a service mode;
when the welding-type power supply is operating in the idle mode or service mode, control the pre-regulator circuit to provide the pre-regulator output voltage at an idle level voltage, a service level voltage, or to disable the pre-regulator output voltage; and
when the welding-type power supply is not operating in the idle mode or the service mode:
control the pre-regulator circuit to provide the pre-regulator output voltage at a first voltage level when a parameter is within a first parameter range, and
control the pre-regulator circuit to provide the pre-regulator output voltage at a second voltage level when the parameter is within a second parameter range.

11. The power supply of claim 10, wherein the input power is an input voltage or a rectified input voltage and the parameter comprises the input voltage or the rectified input voltage.

12. The power supply of claim 10, wherein the input power comprises an AC input power, the pre-regulator circuit comprises one or more of a boost converter, a stacked boost converter, a buck converter, or a boost-buck converter, and the power conversion circuitry further comprises:
an input circuit configured to receive the AC input power, convert the AC input power to a DC input power, and provide the DC input power to the pre-regulator circuit; and
an output circuit configured to receive the pre-regulator output voltage and convert the pre-regulator output voltage to the welding-type output power.

13. The power supply of claim 12, wherein the input circuit comprises a rectifier circuit, the DC input power comprises the rectified input power, and the output circuit comprises an inverter circuit.

14. The power supply of claim 10, wherein the control circuitry is configured to determine the welding-type power supply is operating in the idle mode when the welding-type output power drawn from the power conversion circuitry is less than a power threshold, or a torch activation signal has not been received, for a threshold period of time.

15. The power supply of claim 10, wherein the control circuitry is configured to control the pre-regulator circuit to provide the service level voltage in response to selection of the service mode received via an operator interface, a connection of a service tool with the welding-type power supply, or an input voltage or rectified input voltage being in a service mode range.

* * * * *